United States Patent [19]

Hermanns

[11] 4,112,960
[45] Sep. 12, 1978

[54] VARIABLE-GRADIENT SPRING SUB-ASSEMBLY

[75] Inventor: Henry M. Hermanns, Huntingdon Valley, Pa.

[73] Assignee: Fischer & Porter Company, Warminster, Pa.

[21] Appl. No.: 779,511

[22] Filed: Mar. 21, 1977

[51] Int. Cl.² .............................................. G05B 11/44
[52] U.S. Cl. ........................................ 137/85; 137/83; 267/175
[58] Field of Search ....................... 137/85, 83, 84, 86; 267/175, 177

[56] References Cited

U.S. PATENT DOCUMENTS

| 1,023,490 | 4/1912 | Beck | 267/175 X |
| 2,265,629 | 12/1941 | Christiansen | 267/175 |
| 3,155,104 | 11/1964 | Hilgert | 137/85 |

Primary Examiner—Alan Cohan
Attorney, Agent, or Firm—Michael Ebert

[57] ABSTRACT

A range spring sub-assembly providing a variable gradient with minimum hysteresis for the feedback assembly of a pneumatic transmitter. The sub-assembly is constituted by a helical spring whose lower end is secured to the pivoted feedback arm of the feedback assembly and whose upper end is coupled by a span adjustment screw to a fixed arm thereof. The arm porton of the screw extending above the fixed arm is engaged by a zero adjustment knob which rests on top of the fixed arm, whereby when the knob is turned, the screw is axially shifted to vary the tension of the spring coupled thereto. The span adjustment screw has a coupling terminal head that is received within the upper end of the spring and is provided with a set of outwardly projecting pins. The pins are at different heights and are interposed between adjacent convolutions of the spring whereby the pinned convolutions are rendered inactive and the convolutions therebelow remain active. By rotating the screw, the number of active convolutions is varied, thereby varying the gradient of the spring.

4 Claims, 6 Drawing Figures

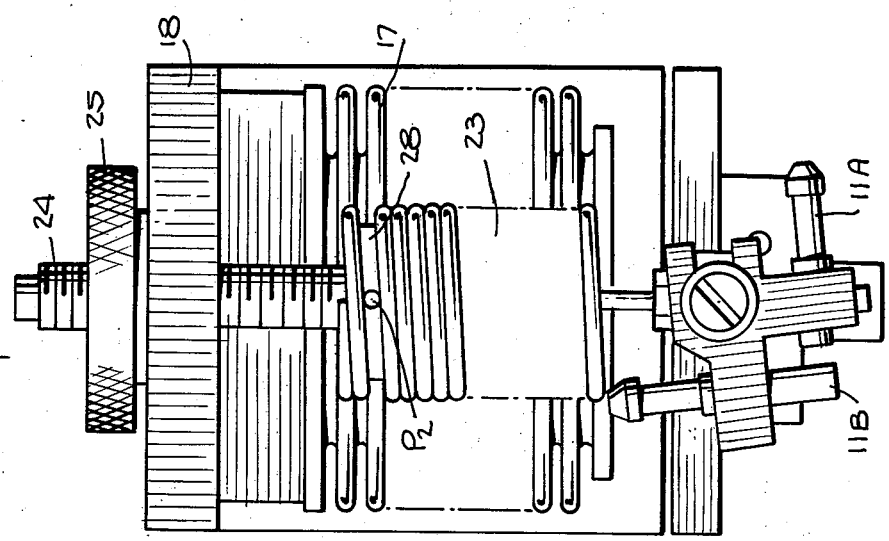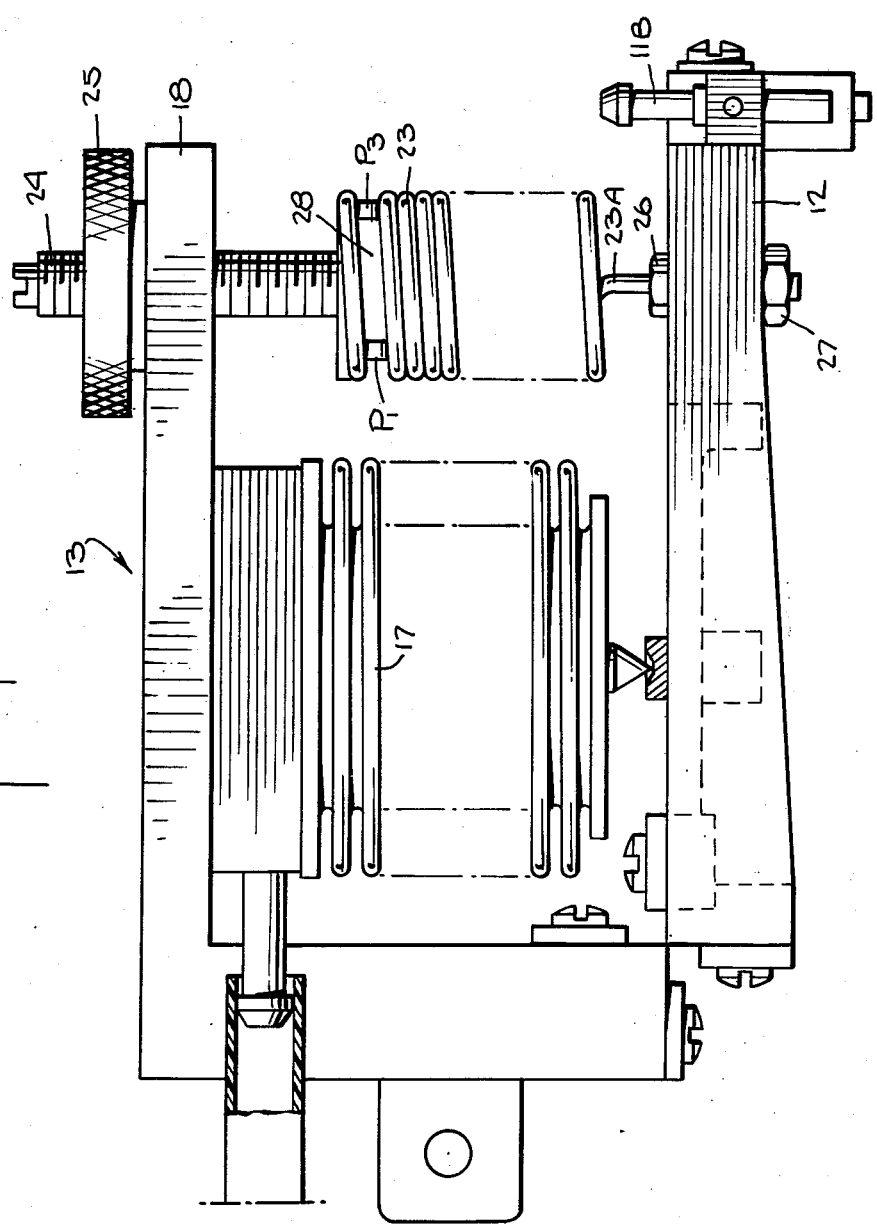

VARIABLE-GRADIENT SPRING SUB-ASSEMBLY

BACKGROUND OF INVENTION

This invention relates generally to a feedback assembly for pneumatic transmitters, and more particularly to a range spring sub-assembly for the feedback assembly to provide a variable gradient with minimum hysteresis.

In the copending application of Satori, Ser. No. 703,529, filed July 8, 1976, entitled "Pneumatic Transmitter for Variable Area Flowmeter," issued as U.S. Pat. No. 4,019,369, whose entire disclosure is incorporated herein by reference, there is disclosed a pneumatic transmitter which generates a pneumatic output signal proportional to a metered fluid flow rate.

The fluid is metered by a variable area flowmeter having a float therein that rises and falls, the float movement being converted by a magnetic follower into a corresponding rotary movement. The pneumatic transmitter is coupled to the magnetic follower, use being made for this purpose of an edge-profiled disc mounted on the follower shaft. The disc rotates in a direction and to an extent depending on the rise and fall of the float, the disc movement therefor being a function of flow rate.

Associated with the disc is an edge sensor constituted by a jet nozzle emitting a stream of air that is picked up by a jet collector, the edge of the rotary disc being inserted in the gap between the nozzle and the collector. Accordingly, the air pressure recovered by the collector increases as the edge profiled disc withdraws from the air stream and decreases as the disc edge moves toward the stream.

To translate the metered flow rate into a corresponding pneumatic signal, the edge sensor is mounted on the pivoted feedback arm of a feedback assembly. The arm is actuated by a feedback bellows responsive to the collector output of the edge sensor. Thus as the collector output pressure changes, the bellows acts to swing the pivoted arm in a direction and to an extent causing the edge sensor carried on the arm to assume a position with respect to the edge of the disc at which the pressure balance of the system is restored. The pressure applied to the bellows at equilibrium represents the pneumatic output of the system.

In the Satori feedback assembly, bridged between the pivoted feedback arm carrying the edge sensor and a fixed arm is the tension spring of a range spring sub-assembly which includes a zero adjustment knob and a span adjusting screw whereby the span of the system may be adjusted as desired. This sub-assembly is subject to hysteresis and gives rise to a pneumatic output signal which is not accurately proportional to changes in input.

SUMMARY OF INVENTION

The primary object of this invention is to provide an improved range spring sub-assembly for the feedback assembly of a pneumatic transmitter to afford an adjustable variable gradient with minimum hysteresis whereby the output signal of the transmitter is accurately proportional to the input thereto.

More particularly, it is an object of this invention to provide a range spring sub-assembly in which a span adjustment screw associated with a helical spring is adapted to vary the number of spring convolutions which are active and thereby vary the gradient of the spring.

A significant feature of the invention resides in an adjustment screw having a terminal head which is received within an end portion of the helical spring, the head having pins projecting outwardly therefrom which are interposed between the convolutions of the spring to form a stable platform therefor, thereby minimizing rocking and sliding actions resulting in hysteresis.

Briefly stated, these objects are accomplished in a range sub-assembly for a feedback assembly provided with a frame arm on which is mounted a feedback bellows operatively coupled to a pivoted feedback arm that is more or less parallel to the frame arm.

The sub-assembly is constituted by a helical spring whose lower end is secured to the feedback arm and whose upper end is coupled by a span adjustment screw to the fixed arm to spring bias said feedback arm. The screw extends through a bore in the frame arm, the portion of the screw projecting upwardly from the frame arm being engaged by a zero-adjusting knob which rests on top of the frame arm, whereby zero adjustment may be effected by turning the knob to axially shift the span adjustment screw to vary the tension of the spring.

The span adjustment screw is linked to the spring by its coupling head which is received within the upper end of the spring and is provided with a set of three equi-spaced, outwardly-projecting pins that occupy different heights in accordance with the helix angle of the spring. The pins are interposed between adjacent convolutions of the spring, whereby the pinned convolutions are rendered inactive and those below the pins remain active. By rotating the span-adjustment screw, one may vary the number of active convolutions below the pins and thereby vary the gradient of the spring.

OUTLINE OF DRAWINGS

For a better understanding of the invention as well as other objects and further features thereof, reference is made to the following detailed description to be read in conjunction with the accompanying drawings, wherein:

FIG. 1 schematically illustrates a pneumatic transmitter that includes a feedback assembly incorporating a range spring sub-assembly in accordance with the invention;

FIG. 2 separately shows the sensor associated with the feedback assembly;

FIG. 4 is an end view of the feedback assembly;

FIG. 6 shows the relationship between the span adjustment screw and the spring.

DESCRIPTION OF INVENTION

The Pneumatic Transmitter

Inasmuch as the invention is concerned with a range spring sub-assembly included in the feedback assembly of a pneumatic transmitter, for purposes of background, we shall briefly describe the pneumatic transmitter that is more fully disclosed in the above-identified Satori application.

Figure 1:
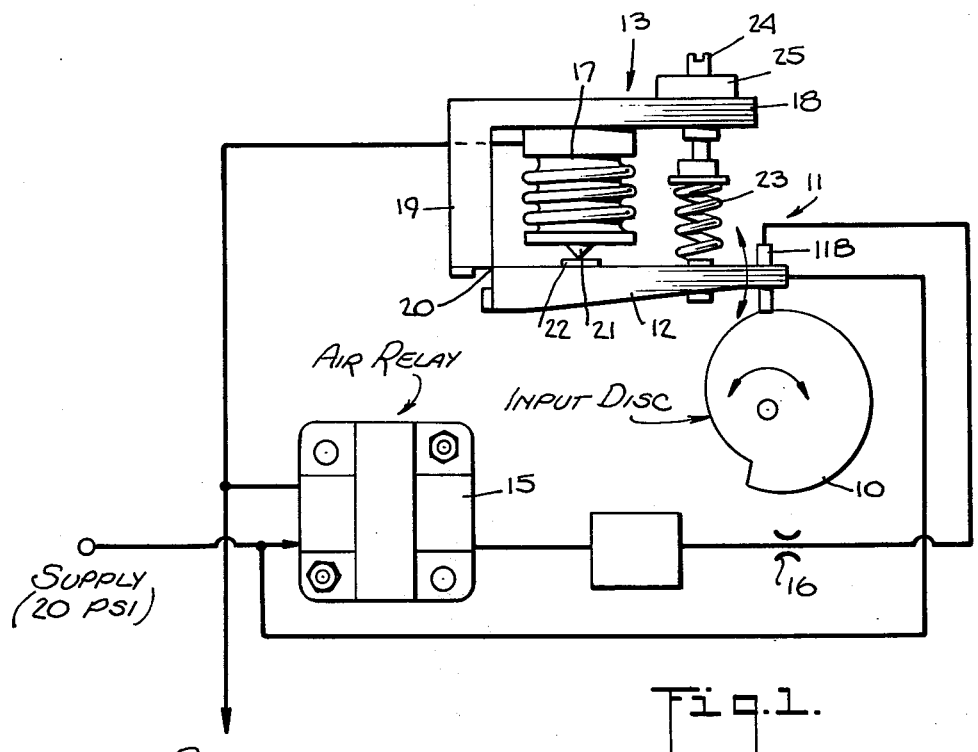
Figure 2:
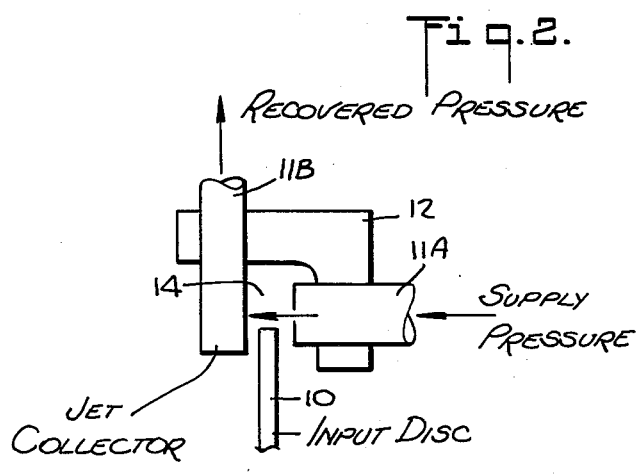

As shown in FIGS. 1 and 2, an edge-profiled disc 10, which is mounted on the shaft of a follower magnetically coupled to the float of a variable area flow tube, is caused to rotate in accordance with the rise and fall of the float, the direction and extent of rotation depending on the flow rate of the fluid being metered.

Disc 10 cooperates with an edge sensor 11 constituted by an air jet nozzle 11A and a jet collector 11B. The sensor is mounted at the free end of the pivoted feedback arm 12 of a feedback assembly, generally designated by numeral 13. Nozzle 11A produces a jet stream which is picked up by collector 11B, the amount of pick-up being varied in accordance with the edge profile of disc 10 which is interposed in gap 14 between the nozzle and the collector.

Nozzle 11A is supplied with pressurized air from a source (20 psi) which also energizes a pneumatic relay 15. The output of collector 11B is fed through a restriction 16 to the input of relay 15 whose output (in the 3 to 15 psi range) is fed to a feedback bellows 17. Bellows 17 is supported on the fixed long arm 18 of an L-shaped frame, which is substantially parallel to feedback arm 12, the feedback arm being pivoted on the short arm 19 of the frame by a cross-springs flexure 20.

The lower end of expansible bellows 17 is provided with a tip 21 inserted within the cavity of a socket 22 secured to feedback arm 12, whereby when the bellows expands, arm 12 is caused to swing downwardly in a direction causing an increased entry of the edge of disc 10 onto gap 14.

Bridged between feedback arm 12 and fixed frame arm 18 is a range spring sub-assembly in accordance with the invention. The sub-assembly is constituted by a helical spring 23, a span adjustment screw 24 and a zero adjustment knob 25 whereby the span of the system may be set as desired.

Thus the pneumatic system constitutes a negative feedback loop; for when a condition arises in which the edge of disc 10 is somewhat withdrawn from gap 14, the resultant air pressure from collector 11B becomes relatively high, as a consequence of which bellows 17, which is responsive to the output of the collector, is dilated to cause feedback arm 12, against the bias imparted thereto by range spring 23, to swing downwardly and thereby increase the entry of disc 10 into the gap to reduce the collected air pressure until a condition of equilibrium is attained. The pneumatic pressure established at equilibrium represents the output of the system and is indicative of the existing flow rate of the fluid being metered.

The Range Spring Sub-Assembly

Figure 3:
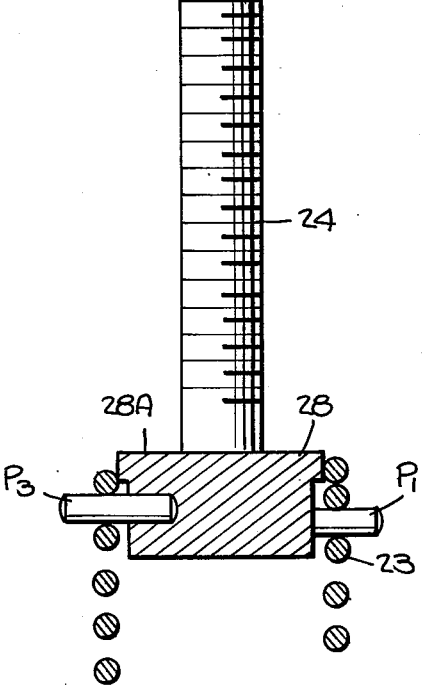
FIG. 3 is a front elevational view of the feedback assembly.
Figure 5:
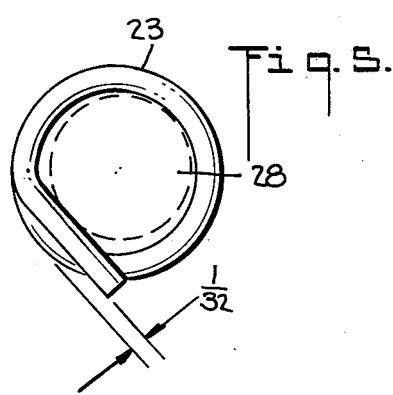
FIG. 5 is a top view of the helical spring included in the sub-assembly.

Referring now to FIGS. 3 and 4, which shows an actual embodiment of a feedback assembly that incorporates a range spring sub-assembly in accordance with the invention, it will be seen that the lower end of helical spring 23 terminates in a straight wire 23A which extends along the central axis of the helix and passes through feedback arm 12 to which it is secured by nuts 26 and 27. It will also be seen that the vertical axes of bellows 17 and spring 23 lie in a common plane that intersects the longitudinal axes of arms 18 and 12.

The upper end of the spring helix is coupled by span adjustment screw 24 to the fixed arm 18 of the frame. For this purpose, as best seen in FIG. 6, screw 24 is formed with a cylindrical coupling head 28 which is received within the upper end of spring 23 and surrounded by the convolutions thereof. Projecting outwardly from head 28 is a set of three equi-spaced pins $P_1$, $P_2$ and $P_3$, which are 120° apart and at different levels, and are each interposed between a pair of adjacent convolutions at the upper end of the helical spring.

The pinned convolutions of the spring are rendered inactive, whereas the convolutions below the coupling head remain active and are stretched apart as the feedback arm is swung downwardly as a function of flow rate. As the spring expands during operation, the convolutions engaged by the pins tend to rock and slide thereon, and this rubbing action generates friction resulting in hysteresis. But because the three pins in the set are equi-spaced about the periphery of the screw coupling head, this affords a stable platform for the upper convolutions of the spring and minimizes the deleterious sliding and rocking action. The invention is, however, not limited to a set of three pins, and, in practice, a greater number may be used to minimize unwanted movement and rubbing.

Since the inside diameter of the spring can be expected to vary, it is necessary to have some clearance between the inside diameter of the spring and the outside diameter of coupling head 28 received within the upper end of the spring. For this purpose, the body of head 28 is reduced in diameter except for the upper face 28A thereof, as shown in FIG. 6. The clearance between the convolutions below the uppermost convolutions 23A and the head portion of reduced diameter allows this head to shift laterally within the spring, which side-to-side shifting could contribute to hysteresis and non-repeatability. However, this lateral shifting is inhibited by closing in the uppermost convolution 23A of the spring, as shown in FIG. 6, so that it embraces the upper face 28A of the head.

By means of the spring sub-assembly, it becomes possible to set the pneumatic transmitter so that a 0 to 100% air pressure output is translated into a 3 psi to 15 psi range, this being equivalent to the 0 to 100% travel of the transmitter sensor. The transmitter is zero set by turning knob 25 to axially shift the span adjustment screw 24 and thereby vary the tension of the spring. Span is adjusted by rotating screw 24, thereby varying the number of active convolutions below the convolutions pinned by the coupling head.

While there has been shown and described a preferred embodiment of a variable gradient spring sub-assembly in accordance with the invention, it will be appreciated that many changes and modifications may be made therein, without, however, departing from the essential spirit thereof.

I claim:

1. In a feedback assembly for a pneumatic transmitter, said assembly having a fixed arm on which a pressure-responsive bellows is mounted to actuate a pivoted feedback arm that is caused thereby to swing downwardly in accordance with the applied pressure, a range spring sub-assembly for biasing said feedback arm and affording an adjustable variable gradient with minimum hysteresis, said sub-assembly comprising:

A. a helical spring bridging said arms, the lower end of said spring being secured to said feedback arm;
   B. a span-adjustment screw terminating in an enlarged coupling head received in the upper end of said spring, the diameter of the head being substantially the same as the internal diameter of the helical spring, the screw extending through a bore in said fixed arm, said head having a set of at least three equi-spaced outwardly-projecting pins at different levels, each pin being interposed between a pair of adjacent spring convolutions, the difference in the levels being compatible with the helix angle of said spring, the convolutions entrapped by said pins being rendered inactive, the convolutions therebelow remaining active, the number of active convolutions being varied by rotation of said screw; and C. a zero-adjustment knob threadably mounted on the screw portion projecting beyond the fixed arm and resting on this arm whereby rotation of the knob causes an axial shift of said screw.

2. A sub-assembly as set forth in claim 1, wherein said head is of reduced diameter below the upper face thereof to provide clearance between the head and the convolutions of the spring.

3. A sub-assembly as set forth in claim 2, wherein the uppermost convolution of said spring is closed in to embrace said face.

4. A sub-assembly as set forth in claim 1, wherein the vertical axes of said bellows and said spring lie in a common plane extending through the longitudinal axes of said arms.

* * * * *

UNITED STATES PATENT OFFICE
CERTIFICATE OF CORRECTION

Patent No. 4,112,960      Dated September 12, 1978

Inventor(s) Henry M. Hermanns

It is certified that error appears in the above-identified patent and that said Letters Patent are hereby corrected as shown below:

IN THE ABSTRACT - line 7 "arm porton" should have read
-- end portion --

Signed and Sealed this

Fifth Day of December 1978

[SEAL]

Attest:

RUTH C. MASON
Attesting Officer

DONALD W. BANNER
Commissioner of Patents and Trademarks